US012627685B1

(12) United States Patent
Natoli, III et al.

(10) Patent No.: US 12,627,685 B1
(45) Date of Patent: May 12, 2026

(54) METHOD AND SYSTEM FOR AI-BASED AUTONOMOUS SECURITY AGENT

(71) Applicants: Joseph Dominic Natoli, III, San Tan Valley, AZ (US); Samantha Marie Sutterley-Natoli, San Tan Valley, AZ (US)

(72) Inventors: Joseph Dominic Natoli, III, San Tan Valley, AZ (US); Samantha Marie Sutterley-Natoli, San Tan Valley, AZ (US)

( * ) Notice: Subject to any disclaimer, the term of this patent is extended or adjusted under 35 U.S.C. 154(b) by 0 days.

(21) Appl. No.: 19/349,936

(22) Filed: Oct. 3, 2025

(51) Int. Cl.
| | |
|---|---|
| *H04L 29/06* | (2006.01) |
| *H04L 9/40* | (2022.01) |
| *H04L 41/16* | (2022.01) |

(52) U.S. Cl.
CPC .......... *H04L 63/1416* (2013.01); *H04L 41/16* (2013.01)

(58) Field of Classification Search
CPC ............................ H04L 63/1416; H04L 41/16
See application file for complete search history.

(56) References Cited

U.S. PATENT DOCUMENTS

| | | | | |
|---|---|---|---|---|
| 10,192,418 | B1 * | 1/2019 | Kern ...................... | G08B 15/00 |
| 10,607,461 | B2 * | 3/2020 | Williams ............... | A61K 45/06 |
| 11,109,229 | B2 | 8/2021 | Sohail | |
| 12,200,406 | B1 * | 1/2025 | Codner .................. | G06V 20/17 |
| 12,432,294 | B1 * | 9/2025 | Holland ................ | H04M 3/436 |

| | | | | |
|---|---|---|---|---|
| 2003/0169337 | A1 * | 9/2003 | Wilson ................... | H04N 7/181 |
| | | | | 348/E7.086 |
| 2004/0223056 | A1 * | 11/2004 | Norris, Jr. ................ | H04N 7/18 |
| | | | | 348/143 |
| 2006/0117362 | A1 * | 6/2006 | Jones ............... | G08B 13/19697 |
| | | | | 348/E7.086 |
| 2007/0046462 | A1 * | 3/2007 | Fancella .......... | G08B 13/19697 |
| | | | | 340/541 |
| 2007/0120978 | A1 | 5/2007 | Jones | |
| 2009/0121861 | A1 * | 5/2009 | Latham ............ | G08B 13/19632 |
| | | | | 340/541 |
| 2016/0337127 | A1 * | 11/2016 | Schultz ................. | H04L 9/3234 |
| 2021/0243208 | A1 * | 8/2021 | Rubin ................... | G06F 21/554 |

(Continued)

FOREIGN PATENT DOCUMENTS

| | | | | |
|---|---|---|---|---|
| EP | 1391859 A1 * | 2/2004 | ....... | G08B 13/19669 |
| WO | WO-2022005620 A1 * | 1/2022 | ............... | G08G 5/26 |

*Primary Examiner* — Sher A Khan
(74) *Attorney, Agent, or Firm* — Michael D. Eisenberg; MDE Patents

(57) ABSTRACT

A system for an automated processing of security data including a processor of a Home Security Agent (HAS) node configured to host a machine learning (ML) module and connected to security data capture array and to at least one controller of a drone and a memory on which are stored machine-readable instructions that when executed by the processor, cause the processor to: acquire security data from the security data capture array entity reflecting a threat subject extract a set of classifying features reflecting positioning and movements of the threat subject relative to the protected home; generate a feature vector based on the set of classifying features; receive a plurality of security parameters from a security predictive model generated by the ML module using outputs of the ANN based on the classifier feature vector; and generate a threat subject verification verdict based on the classifier feature vector.

20 Claims, 7 Drawing Sheets

(56)         References Cited

U.S. PATENT DOCUMENTS

2022/0101507 A1*    3/2022    Tournier ............. G06Q 50/163
2022/0292189 A1*    9/2022    Silberman ............. G06F 21/554
2024/0320502 A1*    9/2024    Weinwurm ............. G06F 16/51
2025/0175456 A1*    5/2025    Crabtree ............... G06F 16/909
2025/0202708 A1*    6/2025    Parthe ...................... H04L 9/50
2025/0308240 A1*    10/2025   Singh .................... G06V 20/52

* cited by examiner

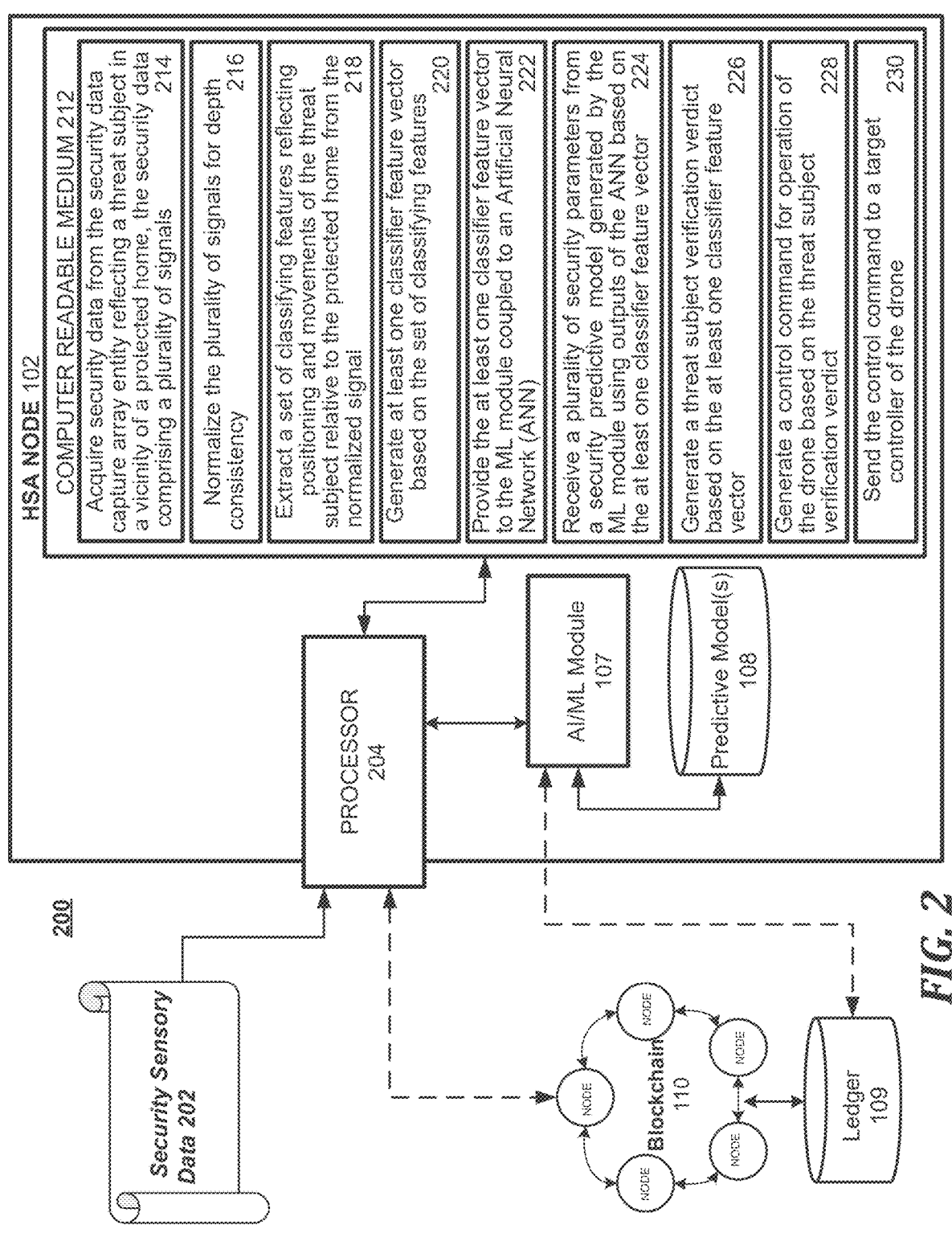

HSA NODE 102

COMPUTER READABLE MEDIUM 212

Acquire security data from the security data capture array entity reflecting a threat subject in a vicinity of a protected home, the security data comprising a plurality of signals    214

Normalize the plurality of signals for depth consistency    216

Extract a set of classifying features reflecting positioning and movements of the threat subject relative to the protected home from the normalized signal    218

Generate at least one classifier feature vector based on the set of classifying features    220

Provide the at least one classifier feature vector to the ML module coupled to an Artificial Neural Network (ANN)    222

Receive a plurality of security parameters from a security predictive model generated by the ML module using outputs of the ANN based on the at least one classifier feature vector    224

Generate a threat subject verification verdict based on the at least one classifier feature vector    226

Generate a control command for operation of the drone based on the threat subject verification verdict    228

Send the control command to a target controller of the drone    230

PROCESSOR 204

AI/ML Module 107

Predictive Model(s) 108

*Security Sensory Data 202*

Blockchain 110

NODE

Ledger 109

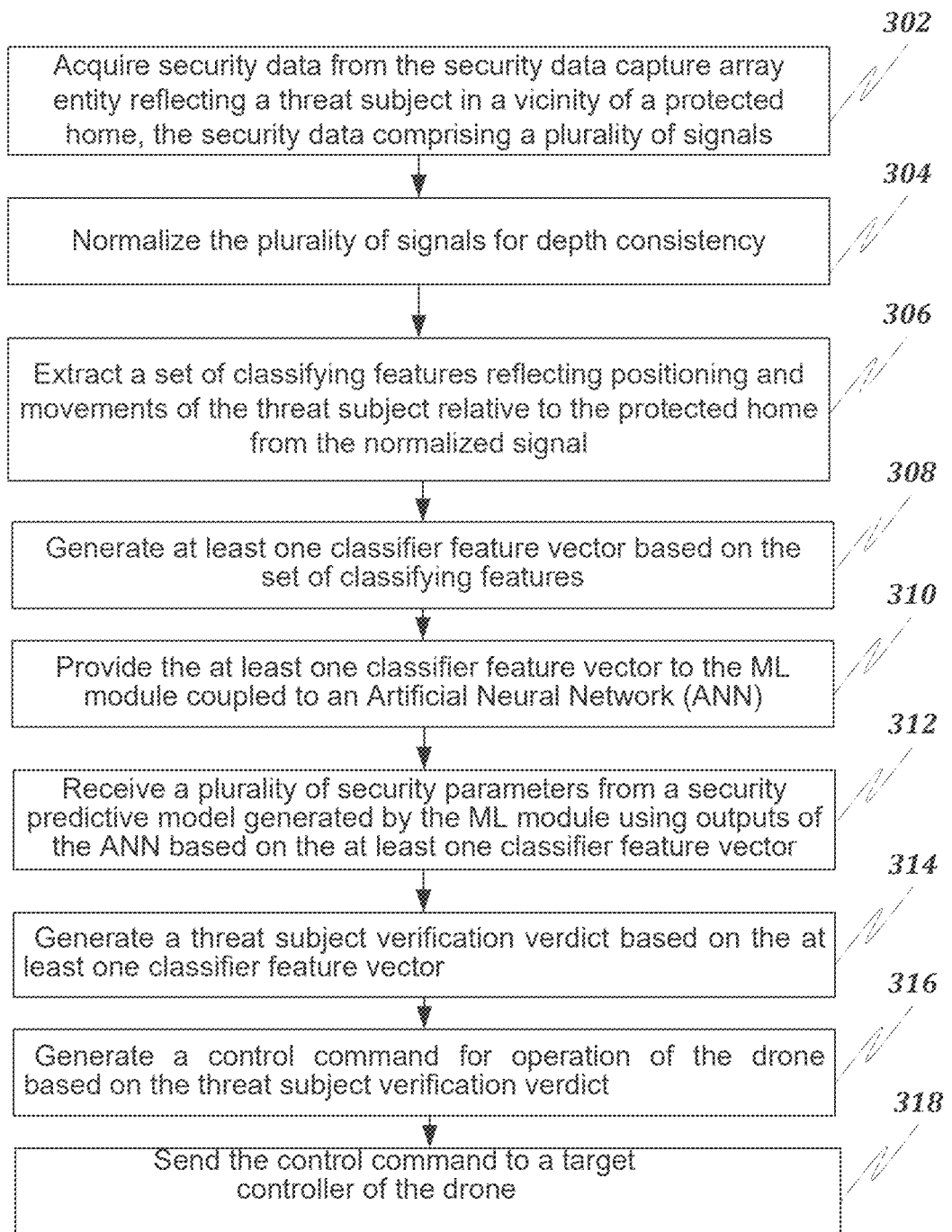

302

Acquire security data from the security data capture array entity reflecting a threat subject in a vicinity of a protected home, the security data comprising a plurality of signals

304

Normalize the plurality of signals for depth consistency

306

Extract a set of classifying features reflecting positioning and movements of the threat subject relative to the protected home from the normalized signal

308

Generate at least one classifier feature vector based on the set of classifying features

310

Provide the at least one classifier feature vector to the ML module coupled to an Artificial Neural Network (ANN)

312

Receive a plurality of security parameters from a security predictive model generated by the ML module using outputs of the ANN based on the at least one classifier feature vector

314

Generate a threat subject verification verdict based on the at least one classifier feature vector

316

Generate a control command for operation of the drone based on the threat subject verification verdict

318

Send the control command to a target controller of the drone

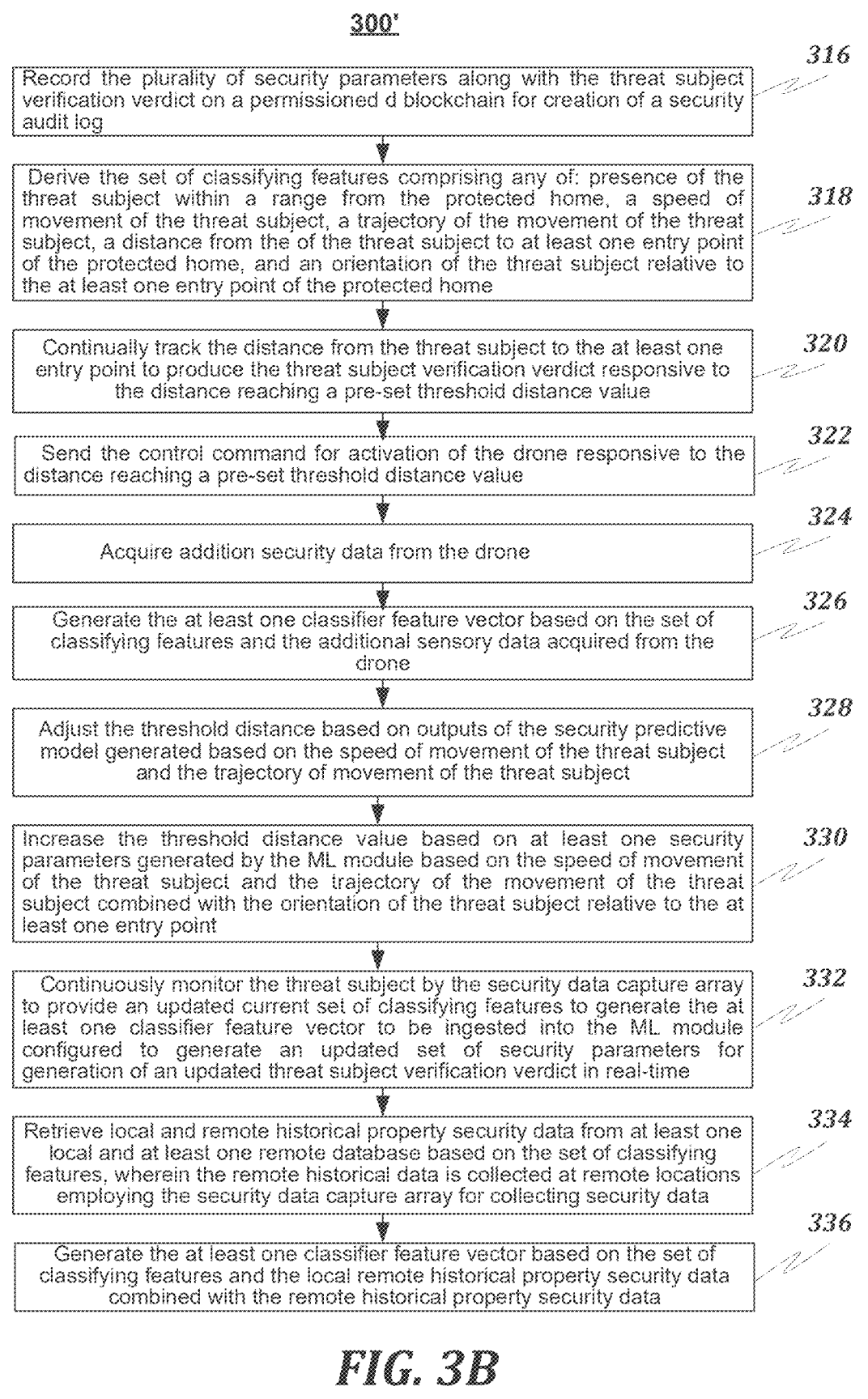

Record the plurality of security parameters along with the threat subject verification verdict on a permissioned d blockchain for creation of a security audit log
*316*

Derive the set of classifying features comprising any of: presence of the threat subject within a range from the protected home, a speed of movement of the threat subject, a trajectory of the movement of the threat subject, a distance from the of the threat subject to at least one entry point of the protected home, and an orientation of the threat subject relative to the at least one entry point of the protected home
*318*

Continually track the distance from the threat subject to the at least one entry point to produce the threat subject verification verdict responsive to the distance reaching a pre-set threshold distance value
*320*

Send the control command for activation of the drone responsive to the distance reaching a pre-set threshold distance value
*322*

Acquire addition security data from the drone
*324*

Generate the at least one classifier feature vector based on the set of classifying features and the additional sensory data acquired from the drone
*326*

Adjust the threshold distance based on outputs of the security predictive model generated based on the speed of movement of the threat subject and the trajectory of movement of the threat subject
*328*

Increase the threshold distance value based on at least one security parameters generated by the ML module based on the speed of movement of the threat subject and the trajectory of the movement of the threat subject combined with the orientation of the threat subject relative to the at least one entry point
*330*

Continuously monitor the threat subject by the security data capture array to provide an updated current set of classifying features to generate the at least one classifier feature vector to be ingested into the ML module configured to generate an updated set of security parameters for generation of an updated threat subject verification verdict in real-time
*332*

Retrieve local and remote historical property security data from at least one local and at least one remote database based on the set of classifying features, wherein the remote historical data is collected at remote locations employing the security data capture array for collecting security data
*334*

Generate the at least one classifier feature vector based on the set of classifying features and the local remote historical property security data combined with the remote historical property security data
*336*

FIG. 3B

<u>400</u>
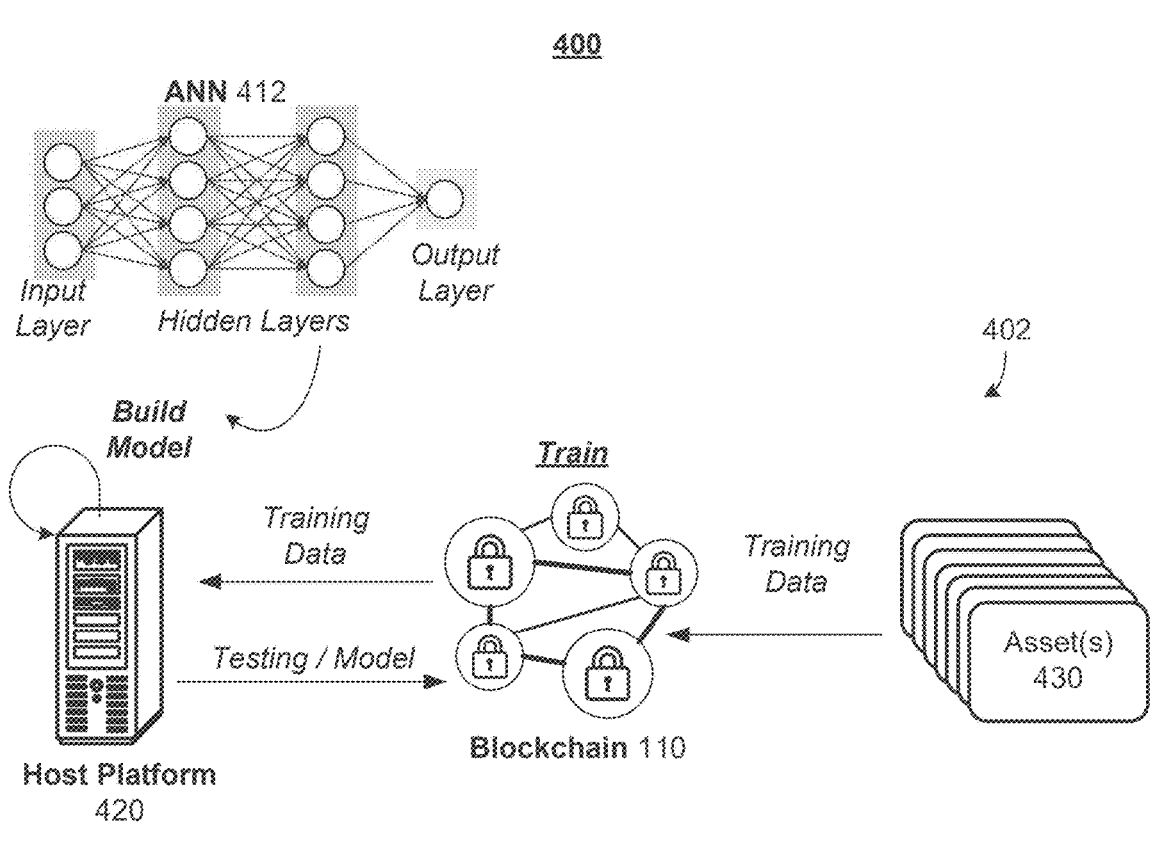
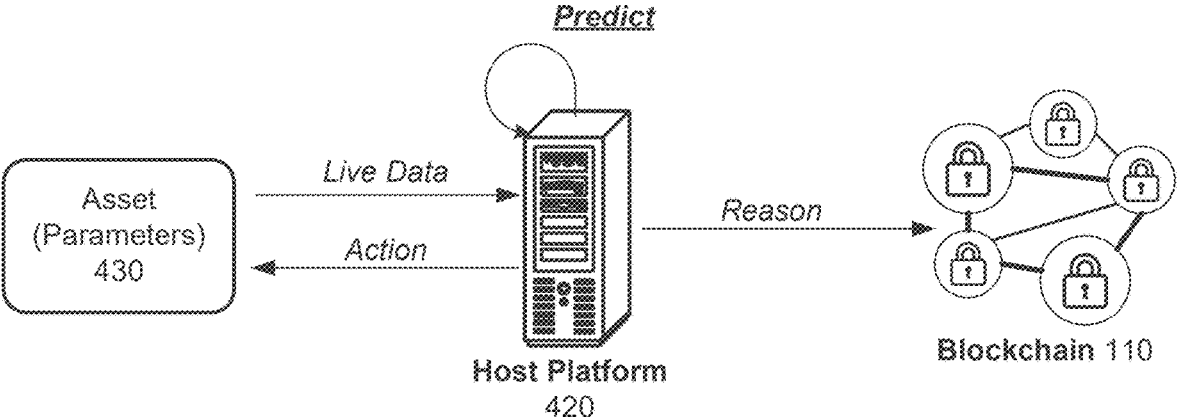
*FIG. 4*

METHOD AND SYSTEM FOR AI-BASED AUTONOMOUS SECURITY AGENT

FIELD OF DISCLOSURE

The present disclosure generally relates to security data processing, and more particularly, to an AI-based automated autonomous security system for processing of sensory data for activation of security measures.

BACKGROUND

The process of remote controlling of connected equipment such as automatic doors by analysis of security video and/or motion detection data is commonly used in homes and Building Management Systems (BMSs).

The existing BMS systems have very limited operational ranges and heavily depend on a single camera or motion detector locations. Thus, these systems provided for a limited security within a smart home, commercial building and/or broader living environments, including amenity spaces.

For example, US 2009/0121861 A1 discloses a security system used to detect, deter, and/or document security events and information from a secured area. The security system may include an intelligence system for distinguishing between false alarms and actual alarm events. The security system may also include multiple deter devices actionable upon detection of an actual alarm event. The security system may further include a security event data collection system that collects event or alarm data pertaining to security events either onsite or remote and a video/camera system that records images of security events.

As another example, US 2007/0120978 A1 discloses an intelligent surveillance platform is provided with wireless two-way sensory surveillance in environments wherein the entire surveillance unit and its supporting structure fit within a standard light switch junction box and otherwise also functions as a light switch. The platform serves as a sensory 'edge-of-network' subsystem for use with a local controller, a central data center engine, and a central viewing platform. The edge-of-network sensory element includes sensors, intelligence and transceivers housed in a wall enclosure under a modified light switch faceplate that incorporates a built-in antenna. The sensors may include an embedded camera, microphone, passive infrared heat detector and odor detector. The intelligence includes memory and logic controller. The transceiver has two-way audio and at least one video channel for broadcast. Light switch wiring supplies power to the device, obviating the need for any specialist installation. Are-chargeable battery device built into the unit enables the device to operate maintenance free without the need to replace any parts over the expected life of the battery.

U.S. Pat. No. 11,109,229 B2 discloses implementing security for a network environment using a centralized smart security system. For example, a method includes implementing a network comprising a plurality of network devices which collectively generate data that is utilized by a computing system to execute an application, and implementing a centralized security system as a computing node within the network to manage security operations within the network and to establish secured and trusted communications between the network devices and the computing system. The network devices may comprise wireless sensor devices operating in a wireless sensor network, wherein the computing system executes an IoT (Internet of Things) application which processes the data that is generated by the wireless sensor devices.

However, these references do not use sensors to operate or initiate drones, smart lights, additional video recording, etc. based on predictive analytics performed by AI/ML learning module. This reference also does not use AI models running on the autonomous security device.

Accordingly, a system and method for an AI-based automated autonomous security system for processing of sensory data for activation of security measures are desired.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for an automated processing of security data including a processor of a Home Security Agent (HAS) node configured to host a machine learning (ML) module and connected to security data capture array and to at least one controller of a drone over a wireless network connection and a memory on which are stored machine-readable instructions that when executed by the processor, cause the processor to: acquire security data from the security data capture array entity reflecting a threat subject in a vicinity of a protected home, the security data including a plurality of signals; normalize the plurality of signals for depth consistency; extract a set of classifying features reflecting positioning and movements of the threat subject relative to the protected home from the normalized signal; generate at least one classifier feature vector based on the set of classifying features; provide the at least one classifier feature vector to the ML module coupled to an Artificial Neural Network (ANN); receive a plurality of security parameters from a security predictive model generated by the ML module using outputs of the ANN based on the at least one classifier feature vector; and generate a threat subject verification verdict based on the at least one classifier feature vector; generate a control command for operation of the drone based on the threat subject verification verdict; and send the control command to a target controller of the drone.

Another embodiment of the present disclosure provides a method that includes one or more of: acquiring security data from the security data capture array entity reflecting a threat subject in a vicinity of a protected home, the security data including a plurality of signals; normalizing the plurality of signals for depth consistency; extracting a set of classifying features reflecting positioning and movements of the threat subject relative to the protected home from the normalized signal; generating at least one classifier feature vector based on the set of classifying features; providing the at least one classifier feature vector to the ML module coupled to an Artificial Neural Network (ANN); receiving a plurality of security parameters from a security predictive model generated by the ML module using outputs of the ANN based on the at least one classifier feature vector; generating a threat subject verification verdict based on the at least one classifier feature vector; and generating a control command for operation of the drone based on the threat subject verification verdict; and sending the control command to a target controller of the drone.

Another embodiment of the present disclosure provides a computer-readable medium including instructions for acquiring security data from the security data capture array entity reflecting a threat subject in a vicinity of a protected home, the security data including a plurality of signals; normalizing the plurality of signals for depth consistency; extracting a set of classifying features reflecting positioning and movements of the threat subject relative to the protected home from the normalized signal; generating at least one classifier feature vector based on the set of classifying features; providing the at least one classifier feature vector to the ML module coupled to an Artificial Neural Network (ANN); receiving a plurality of security parameters from a security predictive model generated by the ML module using outputs of the ANN based on the at least one classifier feature vector; generating a threat subject verification verdict based on the at least one classifier feature vector; and generating a control command for operation of the drone based on the threat subject verification verdict; and sending the control command to a target controller of the drone.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 2 illustrates a network diagram of a system including detailed features of a Home Security Agent (HAS) node, consistent with the present disclosure;

FIG. 3A illustrates a flowchart of a method for AI-based automated processing of sensory data consistent with the present disclosure;

FIG. 3B illustrates a further flowchart of a method for AI-based automated processing of sensory data consistent with the present disclosure;

FIG. 4 illustrates deployment of a machine learning model for prediction of decision parameters and other security-related parameters using blockchain assets consistent with the present disclosure;

DETAILED DESCRIPTION

Figure 1A:
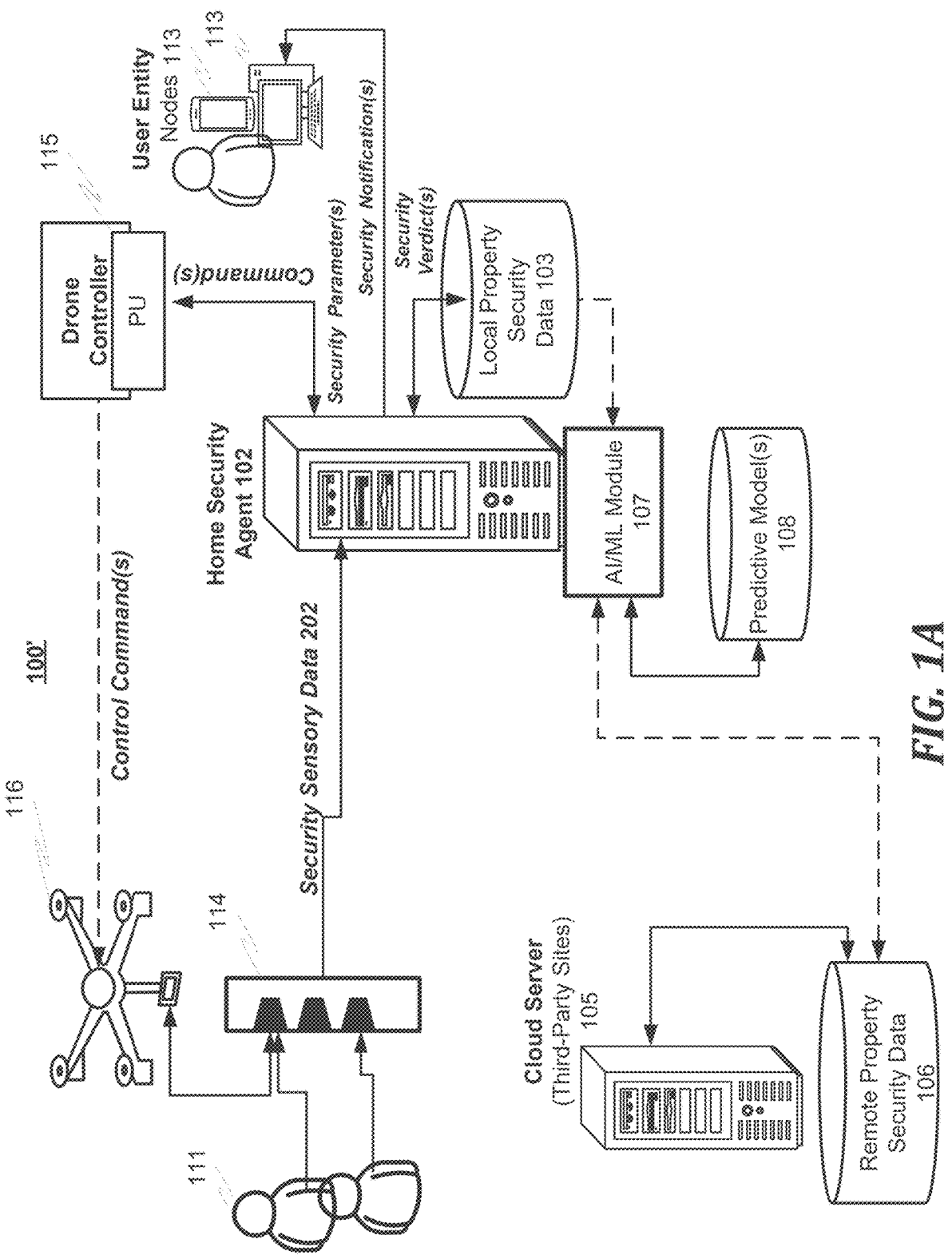
FIG. 1A illustrates a network diagram of a system for an AI-based automated autonomous security system for processing of sensory data for activation of security measures, consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in, the context of AI-based automated autonomous security system for processing of sensory data for activation of security measures activation or other security actions, embodiments of the present disclosure are not limited to use only in this context.

In one embodiment, the present disclosure provides a system, method and computer-readable medium for an AI-based automated autonomous security agents system for processing of security sensory data for activation of security measures or other security actions within a house or a building management environment.

The present disclosure is focused on delivering an unparalleled sensory data-based command response solution, designed to seamlessly integrate with houses or any BMS systems. According to the disclosed embodiments, an AI-based security system is an advanced autonomous agent-based system designed to enhance convenience and security by leveraging artificial intelligence. The system utilizes predictive models using security data from dependable IoT devices using sensors to operate drones, smart lights, additional video recording, etc. based on predictive analytics performed by AI/ML learning module. The disclosed autonomous security agent provides an ability to constantly observe whether sensors and dependent technology are operating and in the case of failure can employ a suite of "self-healing" actions or activate a drone for additional surveillance data.

In one embodiment, the disclosed autonomous security agent may employ a computer vision model responsible for detecting and tracking objects or individuals approaching the doors or other entry points. This model may gather data such as the presence of a person/objects, speed, trajectory, distance from the door, and face or other orientation. The security agent takes this data and intelligently decides based on fine-tuned machine learning (ML) model whether there is an intrusion or security threat. This approach ensures that the detection process specializes in its respective domain, optimizing the system's overall performance.

In one embodiment, a Computer Vision Model may be a proprietary model or may employ Models like YOLOv8 and BoT-SORT that are optimized for detection and tracking tasks, ensuring high accuracy and performance in identifying and following people and objects in real-time. In one embodiment, these models may be specifically trained on proprietary system-relevant datasets to be more accurate for the intended use cases.

Additionally, the decision-making model of the disclosed home security agent (HAS) may be trained using different or additional classes and test the accuracy of the decisions by using different models side by side on the same data. The modularity may also simplifies debugging and maintenance since issues can be isolated to either the detection/tracking phase or the decision-making phase.

In one embodiment, running specialized models can be more efficient than trying to create a single model that handles everything. Each model can be optimized for its specific task, potentially improving overall system performance. In one embodiment, the disclosed security agent module may be capable of running multiple models in parallel, making it suitable for the proposed architecture. The modality may allow each model to be trained and fine-tuned independently.

In one embodiment, a Decision-Making Model may use Deep Learning Framework. As discussed above, the model may take the outputs from the computer vision model (presence, speed, trajectory, distance, face or object orientation) and makes intelligent decisions about further security actions.

In one disclosed embodiment, a threshold distance is used. Once the object is withing a threshold distance, additional alarm and security measures may be activated. The security agent system continually learns from real-time data, refining its decision-making process to optimize security operation based on the data collected locally or remotely at other locations having the houses or buildings of the same type.

As discussed above, the disclosed system may utilize a deep learning framework that integrates data from the computer vision models to make intelligent decisions about security operations. This framework processes real-time data, learning from various factors to optimize the security responses. The key aspects include the deep learning model taking inputs from the security sensors providing e.g., person/object presence, speed, trajectory, distance, emission, heat radiation, vibration and face or object orientation. The security model is trained to recognize patterns and combinations of factors that indicate when the security measures such as drone activations need to be implemented. For example, the model may learn to provide the alarm or notification sooner for fast-approaching individuals and hold of the alarm for slow or stationary ones until they are closer. The disclosed security agent system may employ Adaptive Decision-Making where the model adapts to various scenarios, ensuring the commands to a drone made intelligently based on real-time analysis of the input factors received from the IoT devices and sensors.

By training the model on these comprehensive factors and utilizing advanced computer vision techniques, the disclosed AI-based home security agent (HAS) system makes precise and intelligent decisions about alarms or security operations, enhancing both functionality and security. This unique ability to adjust the threshold distance based on the situation ensures that the security measures are implemented exactly when they should, offering a significant improvement over the traditional sensory security systems that produce a lot of false positives resulting in false alarms, etc.

In one embodiment of the present disclosure, the system provides for machine learning (ML)-generated parameters to be used for analysis and generation of a command(s) that are sent to controllers of the connected devices such as drones or land unmanned vehicles. In one embodiment, an automated decision model may be generated to provide for action-related parameters associated with vision data captured by capturing devices such as, for example, depth cameras, etc.

The automated decision model may use historical security data collected at the current location(s) and at other houses or building facilities equipped with the sensors, drones and controllers of the same type located within a certain range from the current location or even located globally. The relevant security data may include data related to other houses/buildings having the same parameters such as the current object being currently monitored (i.e., a house or a building) such as dimensions (of the building and the lot), size, jurisdiction, etc.

In one disclosed embodiment, the AI/ML technology may be combined with a blockchain technology for secure use of the model training data. In one embodiment, the controlled entities (e.g., drones or land vehicles) may be connected to the Home Security Agent (HSA) node over a blockchain network for added security and to employ a consensus mechanism prior to executing a transaction to release the command related to activation of a connected drone or land vehicle based on the security data-related predictive decision parameters.

In one embodiment, to enhance this process, the system may integrate advanced technologies discussed above, such as Artificial Intelligence (AI) and machine-learning (ML) and Blockchain. The AI may be leveraged for several key functions discussed herein. Additionally, the disclosed system may incorporate Blockchain technology to ensure the transparency and immutability of transactions, providing a secure and trustworthy platform. By embedding these advanced technologies, the disclosed automated HSA system, advantageously, offers a sophisticated and secure solution.

The following definitions may be used in the present disclosure.

"A classifier feature vector" refers to a mathematical representation of the key classifying features, typically in the form of an n-dimensional vector where each dimension corresponds to a specific feature. This vector is used as input for machine learning algorithms to categorize or analyze the security data.

"A security predictive model" refers to machine learning model trained on historical security-related data to predict various outcomes for security verdict generation. This model takes the feature vector as input and outputs predictions about a set of security parameters.

"Pre-set threshold value" refers to a predetermined numerical value used as a decision boundary for triggering actions within the disclosed system. This value may be set based on historical data, expert knowledge, or specific data processing requirements.

"Historical property security-related data" refers to previous successfully identified threat subjects of the same type. The historical property security-related data may be recorded on the blockchain for training of the security predictive model and generation of future threat verifications verdicts.

As discussed above, in one disclosed embodiment, the AI/ML technology may be combined with blockchain technology for secure use of the sensory-related security data. In one embodiment, the ML module may use the security predictive model(s) that use an artificial neural network (ANN), a non-linear modeling approach to extract quantitative features from the sensory data to generate predictive security parameters. The use of specially trained ANNs provides a number of improvements over traditional methods of analyzing of data received from the IoT devices and sensors, including more accurate prediction of security-related determinations and verdicts to be generated in the future. The application further provides methods for training the ANN that leads to a more accurate use of the security predictive model(s).

In one embodiment, the ANN can be implemented by means of computer-executable instructions, hardware, or a combination of the computer-executable instructions and hardware. In one embodiment, neurons of the ANN may be represented by a register, a microprocessor configured to process input signals. Each neuron produces an output, or activation, based on an activation function that uses the outputs of the previous layer and a set of weights as inputs. Each neuron in a neuron array may be connected to another neuron via a synaptic circuit. A synaptic circuit may include a memory for storing a synaptic weight. A proposed ANN may be implemented as a Deep Neural Network that has an input layer, an output layer, attention-mechanism blocks, convolutional blocks, residual blocks, and several fully connected hidden layers. The proposed ANN may be particularly useful for security predictive model generation because the ANN can effectively extract features from the security sensory data in linear and non-linear relationships. In some embodiments, the proposed ANN may be implemented by an application-specific integrated circuit (ASIC). The ASICs may be specially designed and configured for a specific AI application and may provide superior computing capabilities and reduced electricity and computational resources consumption compared to the traditional CPUs.

FIG. 1A illustrates a network diagram of a system for an AI-based automated autonomous security system for processing of sensory data for activation of security measures, consistent with the present disclosure.

Referring to FIG. 1A, the example network 100 includes the HSA node 102 connected to security data capturing array 114 (see FIG. 1A-B) to receive security sensory data 202 reflecting threat subjects 111. The HSA node 102 is configured to host an AI/ML module 107. As discussed above with respect to FIGS. 1A-B, the HSA node 102 may receive the security sensory data 202 provided by the security data capture array (or arrays) 114 that may be implemented as, but not limited to, video cameras, laser detectors, depth cameras, motion detector, emission detectors, infra-red thermal radiation detectors, chemical sensors, etc.

The AI/ML module 107 may generate a predictive model(s) 108 based on the security sensory data 202 processed by the HSA node 102. As discussed above, the AI/ML module 107 may provide predictive outputs data in the form of security parameters for automatic generation of a threat subject verification verdict that may be used for producing control command signals for the target connected devices such as drones 116 (or unmanned land vehicles not shown). In one embodiment, the HSA node 102 may process the predictive outputs data received from the AI/ML module 107 to switch to an actuation—i.e., preparation to active the automatic drones 116 or provide alarm notifications to user entities 113.

As discussed above, the HSA node 102 may acquire and analyze the security sensory data 202 from the security data capture array 114 (FIGS. 1A-B) to generate the commands for the target controller 115 processing unit for activation of the drones 116. While this example describes in detail only one HSA node 102, multiple such nodes may be connected to the network and to the blockchain.

In one embodiment, the signals data from the security data capture array 114 may be processed by the HSA node 102 to parse out classifying features to be used by the AI/ML module 107 to produce predictive security parameters that may be used to generate a control command(s) to be sent to the PU of the target controller 115 of connected target device(s)—e.g., drones 116 or unmanned vehicles with security sensors (not shown).

The HSA node 102 may query a local property security-related database for the historical local security data'-related parameters 103 associated with the current security data classifying features. The HSA node 102 may acquire relevant remote property security-related data 106 from a remote database residing on a cloud server 105. The remote data 106 may be collected from other private and/or commercial buildings, offices entities equipped with the same or similar HSA nodes 102. The remote property security-related data 106 may be collected from protected properties that have the same (or similar) physical features dimensions of the building and the lot, locations, jurisdictions etc. as the local property being protected by the HSA node 102.

The HSA node 102 may generate a feature vector or classifier based on the captured security sensory data 202 and the collected heuristics data (i.e., pre-stored local data 103 and remote data 106). The HSA node 102 may ingest the classifier/vector data into an AI/ML module 107. The AI/ML module 107 may generate a security predictive model(s) 108 based on the classifier/vector data to predict action-related decision parameters for automatically generating a control command(s) to be provided to the connected target devices (drones and autonomous vehicles) assigned to the home or to the BMS. The action-related parameters may be further analyzed by the HSA node 102 prior to generation of the command(s) in order to eliminate false-negatives/positives determinations especially at the earlier stages of training of the security predictive model(s) 108.

Figure 1B:
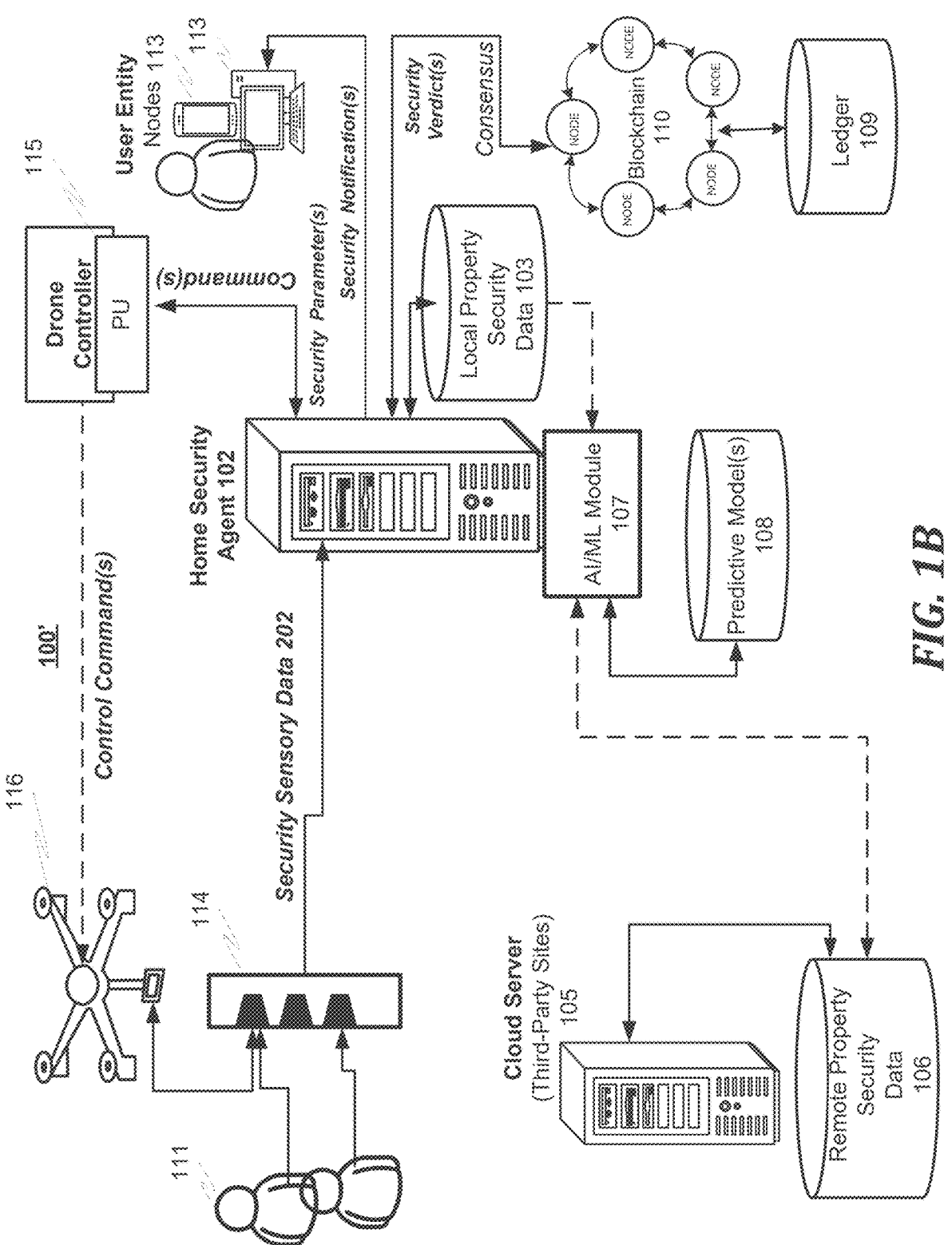
FIG. 1B illustrates a network diagram of a system for the AI-based automated autonomous security system for processing of sensory data for activation of security measures implemented over blockchain network, consistent with the present disclosure.

FIG. 1B illustrates a network diagram of a system for the AI-based automated autonomous security system for processing of sensory data for activation of security measures implemented over blockchain network, consistent with the present disclosure.

Referring to FIG. 1B, the example network 100' includes the HSA node 102 connected to security data capturing array 114 (see FIG. 1A-B) to receive security sensory data 202 reflecting threat subjects 111. The HSA node 102 is configured to host an AI/ML module 107. As discussed above with respect to FIGS. 1A-B, the HSA node 102 may receive the security sensory data 202 provided by the security data capture array (or arrays) 114 that may be implemented as, but not limited to, video cameras, laser detectors, depth cameras, motion detector, emission detectors, infra-red thermal radiation detectors, chemical sensors, etc.

The AI/ML module 107 may generate a predictive model (s) 108 based on the security sensory data 202 processed by the HSA node 102. As discussed above, the AI/ML module 107 may provide predictive outputs data in the form of security parameters for automatic generation of a threat subject verification verdict that may be used for producing control command signals for the target connected devices such as drones 116 (or unmanned land vehicles not shown).

In one embodiment, the HSA node 102 may process the predictive outputs data received from the AI/ML module 107 to switch to an actuation—i.e., preparation to active the automatic drones 116 or provide alarm notifications to user entities 113.

As discussed above, the HSA node 102 may acquire and analyze the security sensory data 202 from the security data capture array 114 (FIGS. 1A-B) to generate the commands for the target controller 115 processing unit for activation of the drones 116. While this example describes in detail only one HSA node 102, multiple such nodes may be connected to the network and to the blockchain.

In one embodiment, the signals data from the security data capture array 114 may be processed by the HSA node 102 to parse out classifying features to be used by the AI/ML module 107 to produce predictive security parameters that may be used to generate a control command(s) to be sent to the PU of the target controller 115 of connected target device(s)—e.g., drones 116 or unmanned vehicles with security sensors (not shown).

The HSA node 102 may query a local property security-related database for the historical local security data'-related parameters 103 associated with the current security data classifying features. The HSA node 102 may acquire relevant remote property security-related data 106 from a remote database residing on a cloud server 105. The remote data 106 may be collected from other private and/or commercial buildings, offices entities equipped with the same or similar HSA nodes 102. The remote property security-related data 106 may be collected from protected properties that have the same (or similar) physical features dimensions of the building and the lot, locations, jurisdictions etc. as the local property being protected by the HSA node 102.

The HSA node 102 may generate a feature vector or classifier based on the captured security sensory data 202 and the collected heuristics data (i.e., pre-stored local data 103 and remote data 106). The HSA node 102 may ingest the classifier/vector data into an AI/ML module 107. The AI/ML module 107 may generate a security predictive model(s) 108 based on the classifier/vector data to predict action-related decision parameters for automatically generating a control command(s) to be provided to the connected target devices (drones and autonomous vehicles) assigned to the home or to the BMS. The action-related parameters may be further analyzed by the HSA node 102 prior to generation of the command(s) in order to eliminate false-negatives/positives determinations especially at the earlier stages of training of the security predictive model(s) 108. In one embodiment, a privacy-preserving distributed knowledge system implemented using a tamper-evident ledger, blockchain, or equivalent append-only data structure may be used.

In one embodiment, the HSA node 102 may receive the security parameters from a permissioned blockchain 110 ledger 109 based on a consensus from the node(s) 102 and user nodes 113. Additionally, confidential historical security-related information and previous threat subject-related metrics data may also be acquired from the permissioned blockchain 110. The newly acquired threat subject-related data with corresponding predicted security parameters data may be also recorded on the ledger 109 of the blockchain 110 so it can be used as training data for the predictive security model(s) 108.

In this implementation the HSA node 102 and the cloud server 105 may serve as blockchain 110 peer nodes. In one embodiment, local data from the database 103 and remote data from the database 106 may be duplicated on the blockchain ledger 109 for higher security of storage.

The AI/ML module 107 may generate the security predictive model(s) 108 to predict the security parameters in response to the specific relevant pre-stored threat subject-related data acquired from the blockchain 110 ledger 109. This way, the current security parameters may be predicted based not only on the current security data (including live sensory security data 202), but also based on the previously collected heuristics. After the security data processing is completed, the related security report documents may be converted into unique secure non-fungible tokens (NFT) assets to be recorded on the blockchain to be used for future predictive security models' training.

In one embodiment, as a second round of approval, a blockchain consensus may be achieved among the user entities 113 in order to approve the security verdicts and commands generated by the HSA node 102.

In one embodiment, the HSA node 102 may predict which other sensor(s) to activate instead if data from one sensor is not clear or the sensor misfunctions. Then, the HSA node 102 maybe activate another backup sensor or activate a drone or unmanned vehicle.

While this implementation falls outside of the scope of the present disclosure, in one embodiment, the HSA 102 may intercept intruding signals or network attacks within the protected home wireless or wired network using pattern recognition and other intrusion detection techniques.

FIG. 2 illustrates a network diagram of a system including detailed features of a Home Security Agent (HSA) node, consistent with the present disclosure.

Referring to FIG. 2, the example network 200 includes the HSA node 102 connected to security data capturing array 114 (see FIG. 1A-B) to receive security sensory data 202 reflecting threat subjects 111. The HSA node 102 is configured to host an AI/ML module 107. As discussed above with respect to FIGS. 1A-B, the HSA node 102 may receive the security sensory data 202 provided by the security data capture array (or arrays) 114 that may be implemented as, but not limited to, video cameras, laser detectors, depth cameras, motion detector, emission detectors, infra-red thermal radiation detectors, chemical sensors, etc.

The AI/ML module 107 may generate a predictive model(s) 108 based on the security sensory data 202 processed by the HSA node 102. As discussed above, the AI/ML module 107 may provide predictive outputs data in the form of security parameters for automatic generation of a threat subject verification verdict that may be used for producing control command signals for the target connected devices such as drones 116 (or unmanned land vehicles not shown). In one embodiment, the HSA node 102 may process the predictive outputs data received from the AI/ML module 107 to switch to an actuation—i.e., preparation to active the automatic drones 116 or provide alarm notifications to user entities 113.

As discussed above, the HSA node 102 may acquire and analyze the security sensory data 202 from the security data capture array 114 (FIGS. 1A-B) to generate the commands for the target controller 115 processing unit for activation of the drones 116. While this example describes in detail only one HSA node 102, multiple such nodes may be connected to the network and to the blockchain. It should be understood that the HSA node 102 may include additional components and that some of the components described herein may be removed and/or modified without departing from a scope of the HSA node 102 disclosed herein. The HSA node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the HSA node 102 may include multiple processors, multiple cores, or the like, without departing from the scope of the HSA node 102 system.

The HSA node 102 may also include a non-transitory computer readable medium 212 that may have stored thereon machine-readable instructions executable by the processor 204. Examples of the machine-readable instructions are shown as 214-230 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to acquire security data 202 from the security data capture array 114 entity reflecting a threat subject 111 in a vicinity of a protected home, the security data may include a plurality of signals (FIGS. 1A-B). The processor 204 may fetch, decode, and execute the machine-readable instructions 216 to normalize the plurality of signals for depth consistency. The processor 204 may fetch, decode, and execute the machine-readable instructions 218 to extract a set of classifying features reflecting positioning and movements of the threat subject 111 relative to the protected home from the normalized signal.

The processor 204 may fetch, decode, and execute the machine-readable instructions 220 to generate at least one classifier feature vector based on the set of classifying features. The processor 204 may fetch, decode, and execute the machine-readable instructions 222 to provide the at least one classifier feature vector to the ML module 107 coupled to an Artificial Neural Network (ANN).

The processor 204 may fetch, decode, and execute the machine-readable instructions 224 to receive a plurality of security parameters from a security predictive model 108 generated by the ML module 1017 using outputs of the ANN based on the at least one classifier feature vector. The processor 204 may fetch, decode, and execute the machine-readable instructions 226 to generate a threat subject verification verdict based on the at least one classifier feature vector.

The processor 204 may fetch, decode, and execute the machine-readable instructions 228 to generate a threat subject verification verdict based on the at least one classifier feature vector generate a control command for operation of the drone 116 based on the threat subject verification verdict. The processor 204 may fetch, decode, and execute the machine-readable instructions 230 to send the control command to a target controller processing unit (PU) 115 of the drone 116.

As discussed above, the permissioned blockchain 110 may be configured to use one or more smart contracts that manage transactions related model 108 training for multiple participating nodes and for recording the transactions on a ledger as discussed in more detail below with respect to FIG. 4.

FIG. 3A illustrates a flowchart of a method for AI-based automated processing of security sensory data consistent with the present disclosure.

Referring to FIG. 3A, the method 300 may include one or more of the steps described below. FIG. 3A illustrates a flowchart of an example method executed by the HAS node 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the HSA node 102 may execute some or all of the operations included in the method 300.

With reference to FIG. 3A, at block 302, the processor 204 may acquire security data from the security data capture array entity reflecting a threat subject in a vicinity of a protected home, the security data comprising a plurality of signals. At block 304, the processor 204 may normalize the plurality of signals for depth consistency. At block 306, the processor 204 may extract a set of classifying features reflecting positioning and movements of the threat subject relative to the protected home from the normalized signal. At block 308, the processor 204 may generate at least one classifier feature vector based on the set of classifying features.

At block 310, the processor 204 may provide the at least one classifier feature vector to the ML module coupled to an Artificial Neural Network (ANN). At block 312, the processor 204 may receive a plurality of security parameters from a security predictive model generated by the ML module using outputs of the ANN based on the at least one classifier feature vector. At block 314, the processor 204 may generate a threat subject verification verdict based on the at least one classifier feature vector. At block 316, the processor 204 may generate a control command for operation of the drone based on the threat subject verification verdict. At block 318, the processor 204 may send the control command to a target controller of the drone.

FIG. 3B illustrates a further flowchart of a method for AI-based automated processing of security sensory data consistent with the present disclosure.

Referring to FIG. 3B, the method 300' may include one or more of the steps described below. FIG. 3B illustrates a flowchart of an example method executed by the HSA 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 204 of the HAS node 102 may execute some or all of the operations included in the method 300'.

With reference to FIG. 3B, at block 314, the processor 204 may record the plurality of security parameters along with the threat subject verification verdict on a permissioned blockchain for creation of a security audit log.

At block 316, the processor 204 may record the plurality of security parameters along with the threat subject verification verdict on a permissioned blockchain for creation of a security audit log. At block 318, the processor 204 may derive the set of classifying features comprising any of: presence of the threat subject within a range from the protected home, a speed of movement of the threat subject, a trajectory of the movement of the threat subject, a distance from the of the threat subject to at least one entry point of the protected home, and an orientation of the threat subject relative to the at least one entry point of the protected home.

At block 320, the processor 204 may continually track the distance from the threat subject to the at least one entry point to produce the threat subject verification verdict responsive to the distance reaching a pre-set threshold distance value.

At block 322, the processor 204 may send the control command for activation of the drone responsive to the distance reaching a pre-set threshold distance value. At block 324, the processor 204 may acquire addition security data from the drone. At block 326, the processor 204 may generate the at least one classifier feature vector based on the set of classifying features and the additional sensory data acquired from the drone.

At block 328, the processor 204 may adjust the threshold distance based on outputs of the security predictive model generated based on the speed of movement of the threat subject and the trajectory of movement of the threat subject. At block 330, the processor 204 may increase the threshold distance value based on at least one security parameters generated by the ML module based on the speed of movement of the threat subject and the trajectory of the movement of the threat subject combined with the orientation of the threat subject relative to the at least one entry point. At block 332, the processor 204 may continuously monitor the threat subject by the security data capture array to provide an updated current set of classifying features to generate the at least one classifier feature vector to be ingested into the ML module configured to generate an updated set of security parameters for generation of an updated threat subject verification verdict in real-time.

At block 334, the processor 204 may retrieve local and remote historical property security data from at least one local and at least one remote database based on the set of classifying features, wherein the remote historical data is collected at remote locations employing the security data capture array for collecting security data.

At block 336, the processor 204 may generate the at least one classifier feature vector based on the set of classifying features and the local remote historical property security data combined with the remote historical property security data.

In one disclosed embodiment, the control command-related decision parameters' model may be generated by the AI/ML module 107 that may use training data sets to improve accuracy of the prediction of the decision parameters for the connected target devices (i.e., drones 116 in FIGS. 1A-B). The decision parameters used in training data sets may be stored in a centralized local database (such as one used for storing local data 103 depicted in FIG. 1A). In one embodiment, an ANN may be used in the AI/ML module 107 for the decision parameters modeling and command predictions.

In another embodiment, the AI/ML module 107 may use a decentralized storage such as a blockchain that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 102 and 113 (FIG. 1) may execute a consensus protocol to validate blockchain storage transactions, group the storage transactions into blocks, and build a hash chain over the blocks. This process creates the ledger by ordering the storage transactions, as is necessary, for consistency. In various embodiments, a permissioned and/or a permission-less blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing decision command-related parameters for efficient activation of the target devices, but which do not fully trust one another.

This application utilizes a permissioned (private) blockchain that operates arbitrary, programmable logic, tailored to a decentralized storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

In the example depicted in FIG. 4, a host platform 420 (such as the HSA node 102) builds and deploys a machine learning model for predictive monitoring of assets 430. Here, the host platform 420 may be a cloud platform, an industrial server, a web server, a personal computer, a user device, and the like Assets 430 can represent security parameters. The blockchain 110 can be used to significantly improve both a training process 402 of the machine learning model and the security parameters' predictive process 405 based on a trained machine learning model that uses outputs of the ANN 412. The blockchain 410 can be used to significantly improve both a training process 402 of the machine learning model and the commands-related parameters' predictive process 405 based on a trained machine learning model. For example, in 402, rather than requiring a data scientist/engineer or other user to collect the data, historical data (heuristics—i.e., security capture data) may be stored by the assets 430 themselves (or through an intermediary, not shown) on the blockchain 410.

This can significantly reduce the collection time needed by the host platform 420 when performing predictive model training. For example, using smart contracts, data can be directly and reliably transferred straight from its place of origin (e.g., from the entities 102 and 113 or from databases 103 and 106) to the blockchain 410. By using the blockchain 410 to ensure the security and ownership of the collected data, smart contracts may directly send the data from the assets to the entities that use the data for building a machine learning model. This allows for sharing of data among the assets 430. The collected data may be stored in the blockchain 410 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure.

Furthermore, training of the machine learning model on the collected data may take rounds of refinement and testing by the host platform 420. Each round may be based on additional data or data that was not previously considered to help expand the knowledge of the machine learning model. In 402, the different training and testing steps (and the data associated therewith) may be stored on the blockchain 410 by the host platform 420. Each refinement of the machine learning model (e.g., changes in variables, weights, etc.) may be stored on the blockchain 410. This provides verifiable proof of how the model was trained and what data was used to train the model. Furthermore, when the host platform 420 has achieved a finally trained model, the resulting model itself may be stored on the blockchain 410.

After the model has been trained, it may be deployed to a live environment where it can make command-related predictions/decisions based on the execution of the final trained machine learning model using the commands'-related parameters. In this example, data fed back from the asset 430 may be input into the machine learning model and may be used to make event predictions such as most accurate commands' parameters for performing actions with the target devices based on the incoming captured security data. Determinations made by the execution of the machine learning model (e.g., decision parameters, etc.) at the host platform 420 may be stored on the blockchain 410 to provide auditable/verifiable proof. As one non-limiting example, the machine learning model may predict a future change of a part of the asset 430 (the command-related decision' parameters). The data behind this decision may be stored by the host platform 420 on the blockchain 410.

As discussed above, in one embodiment, the features and/or the actions described and/or depicted herein can occur on or with respect to the blockchain 410. The above embodiments of the present disclosure may be implemented in hardware, in a computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
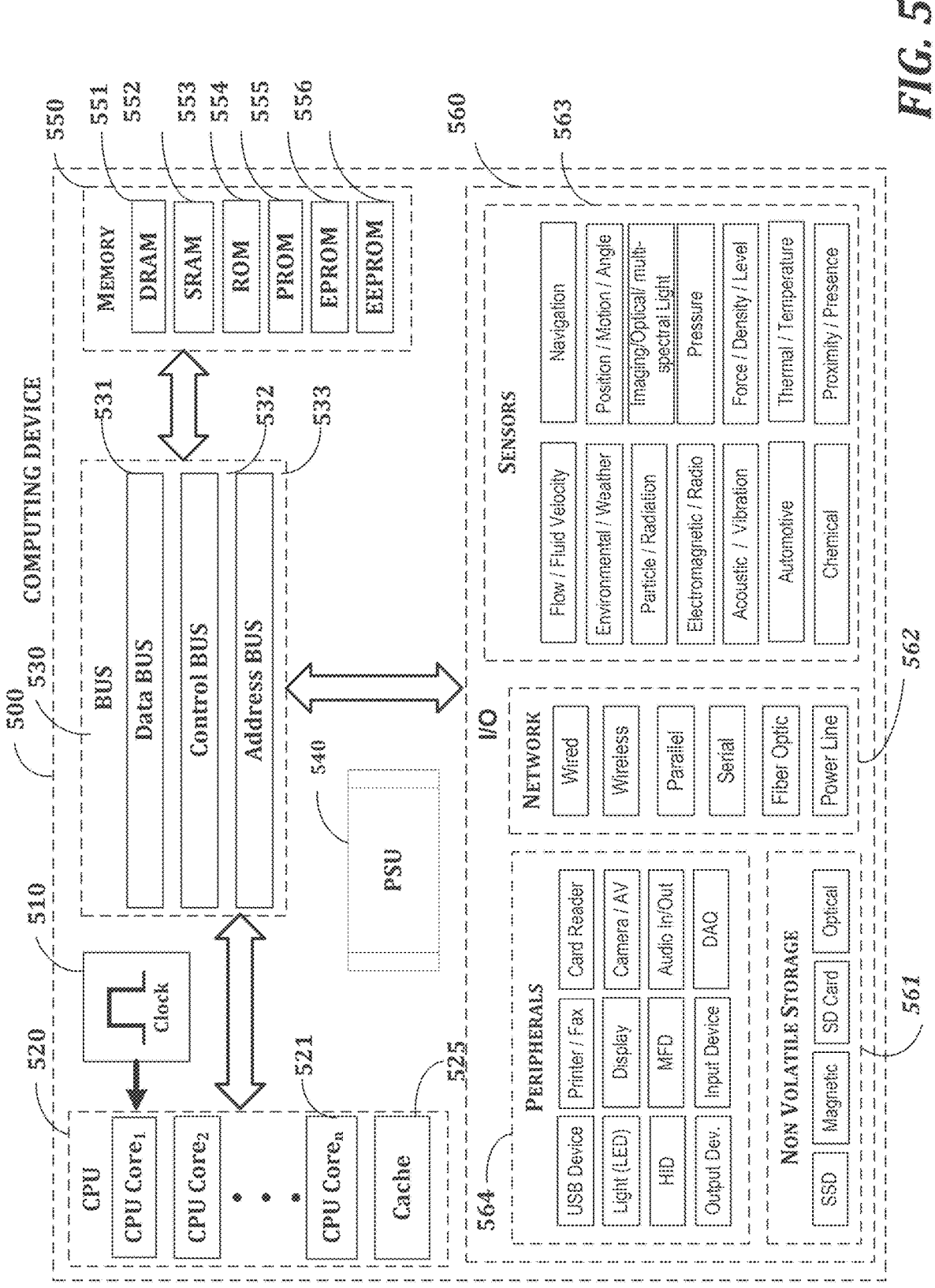
FIG. 5 illustrates a block diagram of a system including a computing device for performing the methods of FIGS. 3A and 3B.

FIG. 5 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a main-
frame, or a quantum computer;

A minicomputer, wherein the minicomputer computing
device comprises, but is not limited to, an IBM AS500/
iSeries/System I, A DEC VAX/PDP, a HP3000, a
Honeywell-Bull DPS, a Texas Instruments TI-990, or a
Wang Laboratories VS Series;

A microcomputer, wherein the microcomputer computing
device comprises, but is not limited to, a server,
wherein a server may be rack mounted, a workstation,
an industrial device, a raspberry pi, a desktop, or an
embedded device;

The HSA node 102 (see FIG. 2) may be hosted on a
centralized server or on a cloud computing service.
Although method 300 has been described to be per-
formed by the HSA node 102 implemented on a com-
puting device 500, it should be understood that, in some
embodiments, different operations may be performed
by a plurality of the computing devices 500 in operative
communication at least one network.

Embodiments of the present disclosure may comprise a
computing device having a central processing unit (CPU)
520, a bus 530, a memory unit 550, a power supply unit
(PSU) 550, and one or more Input/Output (I/O) units. The
CPU 520 coupled to the memory unit 550 and the plurality
of I/O units 560 via the bus 530, all of which are powered
by the PSU 550. It should be understood that, in some
embodiments, each disclosed unit may actually be a plural-
ity of such units for the purposes of redundancy, high
availability, and/or performance. The combination of the
presently disclosed units is configured to perform the stages
any method disclosed herein.

Consistent with an embodiment of the disclosure, the
aforementioned CPU 520, the bus 530, the memory unit 550,
a PSU 550, and the plurality of I/O units 560 may be
implemented in a computing device, such as computing
device 500. Any suitable combination of hardware, soft-
ware, or firmware may be used to implement the aforemen-
tioned units. For example, the CPU 520, the bus 530, and the
memory unit 550 may be implemented with computing
device 500 or any of other computing devices 500, in
combination with computing device 500. The aforemen-
tioned system, device, and components are examples and
other systems, devices, and components may comprise the
aforementioned CPU 520, the bus 530, the memory unit 550,
consistent with embodiments of the disclosure.

At least one computing device 500 may be embodied as
any of the computing elements illustrated in all of the
attached figures, including the HSA node 102 (FIG. 2). A
computing device 500 does not need to be electronic, nor
even have a CPU 520, nor bus 530, nor memory unit 550.
The definition of the computing device 500 to a person
having ordinary skill in the art is "A device that computes,
especially a programmable [usually] electronic machine that
performs high-speed mathematical or logical operations or
that assembles, stores, correlates, or otherwise processes
information." Any device which processes information
qualifies as a computing device 500, especially if the pro-
cessing is purposeful.

With reference to FIG. 5, a system consistent with an
embodiment of the disclosure may include a computing
device, such as computing device 500. In a basic configu-
ration, computing device 500 may include at least one clock
module 510, at least one CPU 520, at least one bus 530, and
at least one memory unit 550, at least one PSU 550, and at
least one I/O 560 module, wherein I/O module may be
comprised of, but not limited to a non-volatile storage sub-module 561, a communication sub-module 562, a sen-
sors sub-module 563, and a peripherals sub-module 565.

A system consistent with an embodiment of the disclosure
the computing device 500 may include the clock module 510
may be known to a person having ordinary skill in the art as
a clock generator, which produces clock signals. Clock
signal is a particular type of signal that oscillates between a
high and a low state and is used like a metronome to
coordinate actions of digital circuits. Most integrated cir-
cuits (ICs) of sufficient complexity use a clock signal in
order to synchronize different parts of the circuit, cycling at
a rate slower than the worst-case internal propagation
delays. The preeminent example of the aforementioned
integrated circuit is the CPU 520, the central component of
modern computers, which relies on a clock. The only
exceptions are asynchronous circuits such as asynchronous
CPUs. The clock 510 can comprise a plurality of embodi-
ments, such as, but not limited to, single-phase clock which
transmits all clock signals on effectively 1 wire, two-phase
clock which distributes clock signals on two wires, each
with non-overlapping pulses, and four-phase clock which
distributes clock signals on 5 wires.

Many computing devices 500 use a "clock multiplier"
which multiplies a lower frequency external clock to the
appropriate clock rate of the CPU 520. This allows the CPU
520 to operate at a much higher frequency than the rest of
the computer, which affords performance gains in situations
where the CPU 520 does not need to wait on an external
factor (like memory 550 or input/output 560). Some
embodiments of the clock 510 may include dynamic fre-
quency change, where, the time between clock edges can
vary widely from one edge to the next and back again.

A system consistent with an embodiment of the disclosure
the computing device 500 may include the CPU unit 520
comprising at least one CPU Core 521. A plurality of CPU
cores 521 may comprise identical CPU cores 521, such as,
but not limited to, homogeneous multi-core systems. It is
also possible for the plurality of CPU cores 521 to comprise
different CPU cores 521, such as, but not limited to, het-
erogeneous multi-core systems, big.LITTLE systems and
some AMD accelerated processing units (APU). The CPU
unit 520 reads and executes program instructions which may
be used across many application domains, for example, but
not limited to, general purpose computing, embedded com-
puting, network computing, digital signal processing (DSP),
and graphics processing (GPU). The CPU unit 520 may run
multiple instructions on separate CPU cores 521 at the same
time. The CPU unit 520 may be integrated into at least one
of a single integrated circuit die and multiple dies in a single
chip package. The single integrated circuit die and multiple
dies in a single chip package may contain a plurality of other
aspects of the computing device 500, for example, but not
limited to, the clock 510, the CPU 520, the bus 530, the
memory 550, and I/O 560.

The CPU unit 520 may contain cache 522 such as, but not
limited to, a level 1 cache, level 2 cache, level 3 cache or
combination thereof. The aforementioned cache 522 may or
may not be shared amongst a plurality of CPU cores 521.
The cache 522 sharing comprises at least one of message
passing and inter-core communication methods may be used
for the at least one CPU Core 521 to communicate with the
cache 522. The inter-core communication methods may
comprise, but not limited to, bus, ring, two-dimensional
mesh, and crossbar. The aforementioned CPU unit 520 may
employ symmetric multiprocessing (SMP) design.

The plurality of the aforementioned CPU cores 521 may
comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, superscalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus

Control bus 532

Address bus 533

System Management Bus (SMBus)

Front-Side-Bus (FSB)

External Bus Interface (EBI)

Local bus

Expansion bus

Lightning bus

Controller Area Network (CAN bus)

Camera Link

ExpressCard

Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.

Small Computer System Interface (SCSI)/Serial Attached SCSI (SAS)

HyperTransport

InfiniBand

RapidIO

Mobile Industry Processor Interface (MIPI)

Coherent Processor Interface (CAPI)

Plug-n-play

1-Wire

Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper {Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).

Music Instrument Digital Interface (MIDI)

Universal Serial Bus (USB), including embodiments such as, but not limited to, Media Transfer Protocol (MTP)/Mobile High-Definition Link (MHL), Device Firmware Upgrade (DFU), wireless USB, InterChip USB, IEEE 1395 Interface/Firewire, Thunderbolt, and extensible Host Controller Interface (xHCI).

Consistent with the embodiments of the present disclosure, the aforementioned computing device 500 may employ hardware integrated circuits that store information for immediate use in the computing device 500, know to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by the at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using intermediate area in the memory 550. The non-volatile storage sub-module 561 does not lose data when power is removed and may be two orders of magnitude less costly than storage used in memory module, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD+RW/DVD±R DL/DVD-RAM/HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, Compact-Flash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be said are networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Wherein cellular systems embody technologies such as, but not limited to, 3G,5G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line and wireless communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (o2), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermoluminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LiDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezocapacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/ resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices uses to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, vision, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices perform that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrumental Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into vision form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

The invention claimed is:

1. A system for an automated processing of security data, comprising:

a processor of a Home Security Agent (HAS) node configured to host a machine learning (ML) module and connected to security data capture array and to at least one controller of a drone over a wireless network connection; and a memory on which are stored machine-readable instructions that when executed by the processor, cause the processor to:

acquire security data from the security data capture array entity reflecting a threat subject in a vicinity of a protected home, the security data comprising a plurality of signals;

normalize the plurality of signals for depth consistency;

extract a set of classifying features reflecting positioning and movements of the threat subject relative to the protected home from the normalized signal;

generate at least one classifier feature vector based on the set of classifying features;

provide the at least one classifier feature vector to the ML module coupled to an Artificial Neural Network (ANN);

receive a plurality of security parameters from a security predictive model generated by the ML module using outputs of the ANN based on the at least one classifier feature vector;

generate a threat subject verification verdict based on the at least one classifier feature vector;

generate a control command for operation of the drone based on the threat subject verification verdict; and send the control command to a target controller of the drone.

2. The system of claim 1, wherein the machine-readable instructions that when executed by the processor, cause the processor to record the plurality of security parameters along with the threat subject verification verdict on a permissioned blockchain for creation of a security audit log.

3. The system of claim 1, wherein the machine-readable instructions that when executed by the processor, cause the processor to derive the set of classifying features comprising any of: presence of the threat subject within a range from the protected home, a speed of movement of the threat subject, a trajectory of the movement of the threat subject, a distance from the of the threat subject to at least one entry point of the protected home, and an orientation of the threat subject relative to the at least one entry point of the protected home.

4. The system of claim 2, wherein the machine-readable instructions that when executed by the processor, cause the processor to continually track the distance from the threat subject to the at least one entry point to produce the threat subject verification verdict responsive to the distance reaching a pre-set threshold distance value.

5. The system of claim 3, wherein the machine-readable instructions that when executed by the processor, cause the processor to send the control command for activation of the drone responsive to the distance reaching a pre-set threshold distance value.

6. The system of claim 4, wherein the machine-readable instructions that when executed by the processor, cause the processor to acquire additional security data from the drone.

7. The system of claim 5, wherein the machine-readable instructions that when executed by the processor, cause the processor to generate the at least one classifier feature vector based on the set of classifying features and the additional sensory data acquired from the drone.

8. The system of claim 6, wherein the machine-readable instructions that when executed by the processor, cause the processor to adjust the threshold distance based on outputs of the security predictive model generated based on the speed of movement of the threat subject and the trajectory of movement of the threat subject.

9. The system of claim 6, wherein the machine-readable instructions that when executed by the processor, cause the processor to increase the threshold distance value based on at least one security parameters generated by the ML module based on the speed of movement of the threat subject and the trajectory of the movement of the threat subject combined with the orientation of the threat subject relative to the at least one entry point.

10. The system of claim 1, wherein the machine-readable instructions that when executed by the processor, cause the processor to continuously monitor the threat subject by the security data capture array to provide an updated current set of classifying features to generate the at least one classifier feature vector to be ingested into the ML module configured to generate an updated set of security parameters for generation of an updated threat subject verification verdict in real-time.

11. The system of claim 10, wherein the machine-readable instructions that when executed by the processor, cause the processor to generate the at least one classifier feature vector based on the set of classifying features and the local remote historical property security data combined with the remote historical property security data.

12. The system of claim 1, wherein the machine-readable instructions that when executed by the processor, cause the processor to retrieve local and remote historical property security data from at least one local and at least one remote database based on the set of classifying features, wherein the remote historical data is collected at remote locations employing the security data capture array for collecting security data.

13. A method for an automated processing of security data, comprising:

acquiring, by a Home Security Agent (HAS) node configured to host a machine learning (ML) module, security data from a security data capture array entity reflecting a threat subject in a vicinity of a protected home, the security data comprising a plurality of signals;

normalizing, by the HAS node, the plurality of signals for depth consistency;

extracting, by the HAS node, a set of classifying features reflecting positioning and movements of the threat subject relative to a protected home from the normalized signal;

generating, by the HAS node, at least one classifier feature vector based on the set of classifying features;

providing, by the HAS node, the at least one classifier feature vector to the ML module coupled to an Artificial Neural Network (ANN);

receiving, by the HAS node, a plurality of security parameters from a security predictive model generated by the ML module using outputs of the ANN based on the at least one classifier feature vector;

generating, by the HAS node, a threat subject verification verdict based on the at least one classifier feature vector;

generating, by the HAS node, a control command for operation of the drone based on the threat subject verification verdict; and sending, by the HAS node, the control command to a target controller of the drone.

14. The method of claim 13, further comprising recording the plurality of security parameters along with the threat subject verification verdict on a permissioned d blockchain for creation of a security audit log.

15. The method of claim 14, further comprising sending the control command for activation of the drone responsive to the updated threat subject verification verdict.

16. The method of claim 13, further comprising deriving the set of classifying features comprising any of: presence of the threat subject within a range from the protected home, a speed of movement of the threat subject, a trajectory of the movement of the threat subject, a distance from the of the threat subject to at least one entry point of the protected home, and an orientation of the threat subject relative to the at least one entry point of the protected home.

17. The method of claim 16, further comprising acquiring additional security data from the drone.

18. The method of claim 13, further comprising continually tracking the distance from the threat subject to the at least one entry point to produce an updated threat subject verification verdict responsive to the distance reaching a pre-set threshold distance value.

19. The method of claim 18, further comprising continuously monitoring the threat subject by the security data capture array to provide an updated current set of classifying features to generate the at least one classifier feature vector to be ingested into the ML module configured to generate an updated set of security parameters for generation of an updated threat subject verification verdict in real-time.

20. A non-transitory computer-readable medium comprising instructions, that when read by a processor, cause the processor to perform:

acquiring security data from a security data capture array entity reflecting a threat subject in a vicinity of a house, the security data comprising a plurality of signals;

normalizing the plurality of signals for depth consistency;

extracting a set of classifying features reflecting positioning and movements of the threat subject relative to a protected home from the normalized signal;

generating at least one classifier feature vector based on the set of classifying features;

providing the at least one classifier feature vector to a machine learning (ML) module coupled to an Artificial Neural Network (ANN);

receiving a plurality of security parameters from a security predictive model generated by the ML module using outputs of the ANN based on the at least one classifier feature vector;

generating a threat subject verification verdict based on the at least one classifier feature vector; and generating a control command for operation of the drone based on the threat subject verification verdict; and sending the control command to a target controller of the drone.

*   *   *   *   *